UNITED STATES PATENT OFFICE.

JULIUS B. B. STRYKER, OF LANSDALE, PENNSYLVANIA, ASSIGNOR TO PERKINS GLUE COMPANY, A CORPORATION OF PENNSYLVANIA.

ADHESIVE AND PROCESS FOR MAKING THE SAME.

1,299,809.

Specification of Letters Patent.   Patented Apr. 8, 1919.

No Drawing.   Application filed July 18, 1917.   Serial No. 175,410.

*To all whom it may concern:*

Be it known that I, JULIUS B. B. STRYKER, a citizen of the United States, and a resident of Landsdale, in the county of Montgomery and State of Pennsylvania, have invented certain new and useful Improvements in Adhesives and Processes for Making the Same, of which the following is a specification.

My invention relates to improvements in adhesives and processes of making the same, and more particularly to the making of vegetable adhesives capable of flowing through pipes and being spreadable by glue applying machinery and yet sufficiently cheap in cost so that they may be used for work where high-priced adhesives would be prohibitive. It is well known that a vegetable glue suitable for high class veneering purposes can be made from cassava starch by degenerating the starch by means of suitable chemicals to a proper point, and then dissolving the starch with about three parts of water or less, and a sufficient amount of caustic alkali to produce a glue having substantially the qualities of animal glue for furniture veneering. In making such a glue, however, the cost has been increased because of the use of relatively high grade starches and the expensive preliminary treatment or degenerating process through which, for various reasons, it is preferred to put the starch or most of it. For the securing together of wood layers in other classes of work, such as the joining of the layers of wood in box shocks, barrel heads, etc., no such high class joint is required. Also, owing to the cheap grade of this work, expensive glues are prohibitive. I find, however, that a vegetable glue can be made suitable for this work by using mainly, if not wholly, raw cassava starch with an increased amount of water and a suitable amount of caustic alkali, and the resulting adhesive will be spreadable by glue applying machinery in a practical way, and sufficiently fluid to flow through pipes, as is required in practical operation, and yet by the use mainly of raw starch and generally using a cheaper grade of starch and by the increase in the amount of water, the cost of the final adhesive is so low as to render it practicable for this cheaper class of work, provided a starch or starches of proper viscosity are selected and the amount of water used with them properly chosen, so that the body of the resulting glue is adapted for the purpose as described. While cassava starch gives on the whole the best results, yet other root starches may be used for the main portion of the starchy material.

In determining the viscosity of the raw and treated starches, I use what is known as the Perkins viscosimeter. Such Perkins viscosimeter consists of a small cup perforated with a small hole in its bottom and the viscosity is ascertained by placing this cup in the material and measuring the number of seconds it takes the cup to fill up through the bottom hole and sink by top overflow. Such a viscosimeter may be constructed of brass tubing 1.295 inches outside diameter, 0.012 inch thick, and 3 inches long, and having a flat brass bottom 0.080 inch thick soldered into the end having a round center hole 0.070 inch in diameter, the total weight being 39.63 grams, and all edges being made smooth removing practically no weight, the hole being polished until the cup placed quickly at its floating level in water at 60° F. floats upright and fills up to the point of sudden sinking by top overflow in 16 seconds. To measure the viscosity of starches with this viscosimeter, the dry starch, if raw, is mixed with 20 parts of water to one of starch and boiled for ten minutes with dry live steam at 100 pounds pressure, and tested for viscosity while hot, in the manner above described. When the viscosity of degenerated starches is being tested, the test is changed, using only 9 parts of water to 1 of starch. In measuring this viscosity, 350 grams of starch are mixed with 3150 cc. of cold water and 450 grams of steam condensed therein, and the same tested at 190° F.

Throughout this specification and the claims where I speak of the viscosity of starch at 20 to 1, I mean that the number of seconds it takes for the viscosimeter to sink in the manner above described in a hot mixture of the starch with 20 parts of water boiled with dry live steam at 100 pounds pressure for 10 minutes, and similarly when I speak of viscosity at 9 to 1, I mean the number of seconds it takes for the viscosimeter to sink in a mixture of the starch and 9 parts of water to 1 part of starch which has been boiled with dry live steam at 100 pounds pressure for 10 minutes. Given the viscosity of a starch on the 20 to 1 scale it is very difficult to say what should be the corresponding starch on the 9 to 1 scale because those starches which are conveniently tested on the 20 to 1 scale produce such viscous solutions on the 9 to 1 scale that satisfactory measurements cannot be taken, and, vice versa those starches which are conveniently tested on the 9 to 1 scale produce such fluent mixtures on the 20 to 1 scale that satisfactory results are not given. Moreover the relative viscosities vary with the kind and condition of the starch employed, and the time elapsing after boiling up and before testing makes considerable differences when the more viscous starches are tested on the 9 to 1 scale. The following, however, will give a general idea of the relation of the two scales. A degenerated cassava starch having a viscosity of 22–23 at 20 to 1 showed a viscosity of 49–55 at 9 to 1. A relatively raw cassava starch having a viscosity of 36–37 at 20 to 1 showed a viscosity of 110–115 at 9 to 1. A raw cassava starch having a viscosity of 44–47 at 20 to 1 showed a viscosity of about 745 at 9 to 1. A degenerated cassava starch having a viscosity of about 68 at 9 to 1 showed a viscosity of about 24 at 20 to 1. Another cassava starch having a viscosity of 34–36 at 20 to 1 showed a viscosity of 180–270 at 9 to 1. A medium or low grade raw cassava starch showing a viscosity of 20 at 20 to 1 showed a viscosity of 47–55 at 9 to 1. A raw cornstarch having a viscosity of 25 at 20 to 1 was so heavy at 9 to 1 that no reading was possible and the same was also true of a certain potato starch having a viscosity of about 75 at 20 to 1, while a certain cassava starch having a viscosity about 75 at 20 to 1 showed a viscosity of about 127 at 9 to 1.

In order that those skilled in the art may more easily carry out the invention, I will give several examples of the process.

Example 1: 84 parts of raw cassava flour, having a viscosity at 20 to 1 of about 21, are mixed with 16 parts of treated cassava flour, the treated flour having a viscosity at 9 to 1 of about 40, and this mixture of starches is mixed with about 4 times its weight of water and then a 33% solution of caustic soda is slowly added during agitation until the percentage of caustic soda added, based on the dry weight of the starches, amounts to about 8%. The agitation is continued until the mixture comes across from a milk suspension of starch in water to a homogeneous colloidal solution of starch alkali and water capable of flowing through pipes 2 inches in diameter and capable of being spread by glue spreading rolls or machinery. While the percentage of caustic alkali used may be varied, preferably about 12% of caustic alkali or less should be used. Even less than 8% may be used, but when the smaller percentages of caustic, such as from 2 to 4% are used, it is desirable to increase the temperature of the mixture. It is found that with increase of temperature, the percentage of caustic required to bring across the mass into a fluid homogeneous adhesive is less. The temperature, however, should not materially exceed the bursting point of the starch, which is in the neighborhood of 165° F. In making up relatively large batches, such as batches of several hundred pounds, from 15 to 25 minutes should be taken to add the caustic soda, and preferably it should not be over 5 hours.

Example 2: 55 parts of raw cassava flour, having a viscosity at 20 to 1 of 90, are mixed with 45 parts of treated cassava having a viscosity at 9 to 1 of 70, and this mixture dissolved with about 4½ parts of water in caustic alkali, in the manner above described.

Example 3: Raw cassava having a viscosity at 20 to 1 of about 21 is mixed with four times its weight of water and the starch dissolved in the water with alkali, in the manner above described.

Example 4: 90 parts cassava flour, having a viscosity at 20 to 1 of about 115, is mixed with 10 parts of degenerated cassava flour having a viscosity at 9 to 1 of about 85, and these starches dissolved in about six times their weight of water with alkali, in the manner above described.

Example 5: 60 parts cassava flour having a viscosity at 20 to 1 of about 21, are mixed with 40 parts of treated cassava flour having a viscosity at 9 to 1 of about 60, and the resulting mixture dissolved with caustic soda in 3½ parts of water, in the manner above described.

Example 6: 80 parts of cassava flour having a viscosity at 20 to 1 of about 45, are mixed with 20 parts of cornstarch having a viscosity at 9 to 1 of about 20, and these starches are dissolved in about four times their weight of water with caustic alkali, in the manner above described.

Example 7: 70 parts of raw cassava flour having a viscosity at 20 to 1 of about 35 are mixed with 30 parts of degenerated starch having a viscosity at 9 to 1 of about 40, and these starches are dissolved in 5 times their weight of water with caustic alkali, in the manner above described.

If higher than normal temperatures are used when bringing across the mixtures into adhesive, the amount of water may sometimes be lessened somewhat, or starches of relatively higher viscosities may be used, or both.

It will be seen that in the above examples the starch used is either mostly or wholly raw starch having a viscosity of less than 150 at 20 to 1 and over 18 at 9 to 1, hence the cost of degenerating most if not all of the starch is eliminated. Furthermore, raw starches of relatively low viscosities are preferred, as those having a viscosity at 20 to 1 of about 60 or less, and over 18 at 9 to 1, and in general these are cheaper than those of the higher viscosities. The amount of water which may be used with various raw starches and mixtures is easily calculated. As will be seen from the above examples, with raw starches having a 20 to 1 viscosity of from 20 to 100 I use from about 4 to about 6 parts of water respectively, and with that portion comprising more degenerated starches, having a 9 to 1 viscosity of from 20 to 100 I use from about 2 to about 4 parts of water respectively. By thus calculating the amount of water for each portion of starch in the batch according to its viscosity and adding the amounts together, the total amount of water for the whole batch or mixture of starches is obtained. While this forms a good working rule it will be understood that it does not have to be adhered to with mathematical accuracy and slight variations may be made without materially changing the result. The amount of caustic alkali which may be used may be varied considerably and depends largely on the temperature used. When the glue is mixed cold about 7% or 8% of caustic soda based on the weight of starch base may be used, but as much as 10% to 14% may be used if desired. It usually takes 7% to 8% however, to produce a thorough solution of the starch in a cold mixture. If the temperature of the batch be raised to about 140° F. it is found that the solution of the starch may be effected with about 3% of caustic soda. The cost per pound of finished adhesive is also decreased by using a greater amount of water than 3 parts. By combining all these various features, I find that a practical commercial adhesive can be obtained for joining wood layers in work where a high class joint is not required, and where the layers of wood being joined are relatively thick as compared with the thin veneers of regular furniture veneering. While in general cassava starch is preferred, yet other starches and particularly potato may be used on occasions where the cost of the same will warrant.

What I claim as new and desire to secure by Letters Patent is:

1. The process of making an adhesive which consists in taking a starch base containing substantially raw cassava starch and having a viscosity at 20 to 1 of about 60 or less and over 18 at 9 to 1, and mixing it with from 3½ to 6 times its weight of water and dissolving the starch in the water with caustic alkali to form a homogeneous colloidal adhesive of starch alkali and water, the amount of water being proportioned relatively to the viscosity of the starch base to produce an adhesive which will be spreadable by glue applying rolls and will flow through pipes two inches in diameter.

2. The process of making an adhesive which consists in mixing root starch having a viscosity of less than 150 at 20 to 1 and over 18 at 9 to 1, with a degenerated starch having a viscosity of about 80 or less at 9 to 1, and more than 18 at 9 to 1 and water, the amount of such raw starch being greater than the amount of degenerated starch and the amount of water being from 3 to 6 times the weight of the starches, and dissolving the starches in the water with caustic alkali to form a homogeneous colloidal adhesive of starch alkali and water, the amount of water being proportioned relatively to the viscosity of the starches to produce an adhesive which will be spreadable by glue applying machinery and will flow through pipes two inches in diameter.

3. The process of making an adhesive which consists in taking a starch base containing substantially raw root starch and having a viscosity at 20 to 1 of about 60 or less and over 18 at 9 to 1, and mixing it with from 3 to 6 times its weight of water and dissolving the starch in the water by adding caustic alkali to form a homogeneous colloidal adhesive of starch alkali and water, the addition of the caustic alkali taking less than 5 hours, and the amount of water being proportioned relatively to the viscosity of the starch base, to produce an adhesive which will be spreadable by glue applying rolls and will flow through pipes two inches in diameter.

4. The process of making an adhesive which consists in mixing raw cassava starch having a viscosity of about 60 or less at 20 to 1 and over 18 at 9 to 1, with a starch of less viscosity, and water, the amount of raw starch being greater than the amount of the other starch and the amount of water being from 3 to 6 times the weight of the starches, and dissolving the starches in the water with caustic alkali to form a homogeneous colloidal adhesive of starch alkali and water, the amount of water being proportioned relatively to the viscosity of the starches to produce an adhesive which will be spreadable by glue applying machinery and will flow through pipes two inches in diameter.

5. The process of making an adhesive which consists in mixing about 85% of raw cassava starch having a viscosity of about 60 or less at 20 to 1 and over 18 at 9 to 1, with about 15% degenerated cassava starch having a viscosity of about 80 or less at 9 to 1 and more than 18 at 9 to 1, with water, the amount of water being about 4 times the weight of the starches, and dissolving the starches in the water with less than 12% of caustic alkali based on the dry weight of the starches, to form a homogeneous colloidal adhesive of starch alkali and water which will flow through pipes two inches in diameter and be spreadable by glue spreading machinery.

6. The process of making an adhesive which consists in taking a starch base containing substantially raw cassava starch and having a viscosity at 20 to 1 of about 60 or less and over 18 at 9 to 1, and mixing it with from 3½ to 6 times its weight of water and dissolving the starch in the water with caustic alkali and heat not materially above the bursting temperature of the starch to form a homogeneous collodial adhesive of starch alkali and water, the amount of water being proportioned relatively to the viscosity of the starch base to produce an adhesive which will be spreadable by glue applying rolls and will flow through pipes two inches in diameter.

7. The process of making an adhesive which consists in mixing raw starch having a viscosity of less than 150 at 20 to 1 and over 18 at 9 to 1, with a degenerated starch having a viscosity of about 80 or less at 9 to 1 and more than 18 at 9 to 1, and water, the amount of such raw starch being greater than the amount of degenerated starch and the amount of water being from 3 to 6 times the weight of the starches, and dissolving the starches in the water with caustic alkali and heat below the bursting temperature of the starch to form a homogeneous collodial adhesive of starch alkali and water, the amount of water being proportioned relatively to the viscosity of the starches to produce an adhesive which will be spreadable by glue applying machinery and will flow through pipes two inches in diameter.

8. The process of making an adhesive which consists in mixing raw cassava starch having a viscosity of about 60 or less at 20 to 1 and over 18 at 9 to 1, with a starch of less viscosity, and water, the amount of raw starch being greater than the amount of the other starch and the amount of water being from 3 to 6 times the weight of the starches, and dissolving the starches in the water with caustic alkali and heat below the bursting temperature of the starch to form a homogeneous colloidal adhesive of starch alkali and water, the amount of water being proportioned relatively to the viscosity of the starches to produce an adhesive which will be spreadable by glue applying machinery and will flow through pipes two inches in diameter.

9. The process of making an adhesive which consists in mixing about 85% of raw cassava starch having a viscosity of about 60 or less at 20 to 1 and over 18 at 9 to 1, with about 15% degenerated cassava starch having a viscosity of about 80 or less at 9 to 1 and more than 18 at 9 to 1, with water, the amount of water being about 4 times the weight of the starches, and dissolving the starches in the water with less than 12% of caustic alkali based on the dry weight of the starches and heat below the bursting temperature of the starches, to form a homogeneous colloidal adhesive of starch alkali and water which will flow through pipes two inches in diameter and be spreadable by glue spreading machinery.

10. The improved vegetable adhesive containing substantially raw cassava starch and having a viscosity at 20 to 1 of about 60 or less and over 18 at 9 to 1, dissolved in from 3½ to 6 times its weight of water with caustic alkali, the adhesive being homogeneous, colloidal and spreadable by glue applying rolls and capable of flowing through pipes two inches in diameter.

11. The improved vegetable adhesive comprising a mixture of starch having a viscosity of less than 150 at 20 to 1 and over 18 at 9 to 1, and a degenerated starch having a viscosity of about 80 or less at 9 to 1 and more than 18 at 9 to 1, dissolved in from 3 to 6 times its weight of water with caustic alkali, the adhesive being homogeneous, colloidal and spreadable by glue applying rolls and capable of flowing through pipes two inches in diameter.

12. The improved vegetable adhesive comprising a mixture of cassava starch having a viscosity of about 60 or less at 20 to 1 and over 18 at 9 to 1 and a starch having less viscosity than the first mentioned starch, dissolved in from 3 to 6 times its weight of water with alkali, the adhesive being homogeneous, colloidal and spreadable by glue applying rolls and capable of flowing through pipes two inches in diameter.

13. The improved vegetable adhesive which comprises a mixture of about 85% of raw cassava starch having a viscosity of about 60 or less at 20 to 1 and over 18 at 9 to 1, and about 15% of degenerated starch having a viscosity of about 80 at 9 to 1 and more than 18 at 9 to 1, dissolved with about 4 times its weight of water and less than 12% of caustic alkali, the adhesive being homogeneous, colloidal and spreadable by glue applying rolls and capable of flowing through pipes two inches in diameter.

14. The improved vegetable adhesive comprising a mixture of a substantially raw starch having a viscosity of less than 150 at 20 to 1 and over 18 at 9 to 1, and a degenerated starch having a viscosity of about 80 or less at 9 to 1 and more than 18 at 9 to 1, the amount of raw starch being greater than the amount of degenerated starch, dissolved in from 3 to 6 times its weight of water with caustic alkali, the adhesive being homogeneous, colloidal and spreadable by glue applying rolls and capable of flowing through pipes two inches in diameter.

Signed at Lansdale in the county of Montgomery and State of Pennsylvania, this 14th day of June, A. D. 1917.

JULIUS B. B. STRYKER.

Witnesses:
G. H. LOVE,
I. E. MOORE.